US006458300B1

(12) United States Patent
Meyer de Groot et al.

(10) Patent No.: US 6,458,300 B1
(45) Date of Patent: Oct. 1, 2002

(54) CONVERSION OF STICKY ELASTOMERIC POLYMER CRUMB INTO PELLETS WITHOUT POLYMER DEGRADATION

(75) Inventors: Eleanor Meyer de Groot, Friendswood, TX (US); Bing Yang, Houston, TX (US); David Ralph Stewart, Richmond, TX (US)

(73) Assignee: KRATON Polymers U.S. LLC, Houston, TX (US)

( * ) Notice: Subject to any disclaimer, the term of this patent is extended or adjusted under 35 U.S.C. 154(b) by 0 days.

(21) Appl. No.: 09/306,123

(22) Filed: May 6, 1999

Related U.S. Application Data

(60) Provisional application No. 60/086,925, filed on May 27, 1998.

(51) Int. Cl.$^7$ .............................................. B29C 47/36
(52) U.S. Cl. ................................... 264/141; 264/211.21
(58) Field of Search ................................. 264/141, 142, 264/143, 140, 211.11, 211.21, 349; 425/376.1

(56) References Cited

U.S. PATENT DOCUMENTS

| | | | |
|---|---|---|---|
| 2,833,750 A | 5/1958 | Vickers ...................... 260/85.3 |
| 3,222,797 A | 12/1965 | Zies ............................. 34/17 |
| 3,360,820 A | 1/1968 | Zitzmann et al. .............. 18/12 |
| 3,382,538 A | 5/1968 | Bumer .......................... 18/12 |
| 3,672,641 A | 6/1972 | Slaby |
| 3,725,332 A | * 4/1973 | Carrock ....................... 524/296 |
| 3,791,913 A | * 2/1974 | Ver Strate et al. |
| 3,930,107 A | * 12/1975 | Yaeda et al. |
| 4,172,871 A | * 10/1979 | Elsworth |
| 4,207,218 A | 6/1980 | Jorgensen, Jr. et al. .... 260/23.7 |
| 4,220,738 A | * 9/1980 | Miki et al. |
| 4,483,886 A | * 11/1984 | Kowalski |
| 4,508,592 A | 4/1985 | Kowalski ..................... 159/2.1 |
| 4,622,193 A | 11/1986 | Kresge et al. ............... 264/141 |
| 4,822,545 A | * 4/1989 | Kresge et al. |
| 4,970,118 A | 11/1990 | Kresge et al. ............... 428/407 |
| 5,028,663 A | 7/1991 | Chung ......................... 525/198 |
| 5,041,249 A | 8/1991 | Yeh .............................. 264/85 |
| 5,114,648 A | * 5/1992 | Kuc, Sr. |
| 5,408,004 A | 4/1995 | Lai et al. ..................... 525/240 |
| 5,415,354 A | 5/1995 | Shutov et al. ................. 241/16 |

FOREIGN PATENT DOCUMENTS

| | | |
|---|---|---|
| EP | 0033351 | 1/1980 |
| EP | 0050039 | 10/1981 |
| EP | 0427339 | 11/1990 |
| FR | 2050057 | 6/1970 |

OTHER PUBLICATIONS

Rubber Technology, 3$^{rd}$ edition, Morton, Maurice Ed., pp. 221–222, 1987.*

Principles of Polymerization, 2$^{nd}$ Edition, George Odian, Ed., 1981, pp. 389–399.*

"Solid–State Extrusion Technique Tackles Commingled PCR," by Joseph Ogando, *Technology News*, Plastics Technology, Jun. 1994, pp. 37–38.

* cited by examiner

*Primary Examiner*—Mark Eashoo

(57) ABSTRACT

A process for pelletizing elastomeric anionically polymerized polymers which comprises subjecting the polymer to solid state extrusion in a single screw extruder with a length to diameter ratio of 10:1 or less wherein the barrel of the extruder has longitudinal grooves and transversally extending pins to increase mixing wherein the temperature in the extruder is sufficient to agglomerate or melt the polymer but be lower than the degradation temperature of the polymer and the speed of the extruder screw is from 30 to 100 rpm.

13 Claims, No Drawings

CONVERSION OF STICKY ELASTOMERIC POLYMER CRUMB INTO PELLETS WITHOUT POLYMER DEGRADATION

This application claims the benefit of U.S. Provisional Application No. 60/086,925, filed May 27, 1998, the entire disclosure of which is hereby incorporated by reference.

FIELD OF THE INVENTION

This invention relates to the finishing, i.e., final processing, of elastomeric polymers that are normally produced in crumb form, which typically has a fine particle size. More particularly, the invention relates to a process for converting difficult to process sticky polymer crumb into an easy to process pellet form without significant polymer degradation.

BACKGROUND OF THE INVENTION

Elastomeric polymers of styrene and butadiene or isoprene are anionically polymerized in an organic solvent. Such polymers are also often hydrogenated while in the solvent. The final step in the production of these polymers requires removing the solvent from the polymer/solvent mixture/slurry/suspension, usually referred to as the polymer cement, to produce dry material which can be packaged. This final processing step is often referred to as "finishing" the polymer. These polymers are generally produced as a crumb that is sometimes difficult to handle and is many times undesirably sticky as well. Problems associated with the adhesive nature of this sticky material put limitations on whether it can be realistically or profitably manufactured.

Even when it is realistically possible to manufacture these products, the product's form can be difficult for endusers to handle and put to its desired use. Such products are often sold as crumb in bags. This product form is difficult for some users to handle. Crumb particle size is often fine and it tends to coat equipment, particularly in the case of sticky grades, creating mess and waste. Some products block in the bags, forming a 30 to 40 lb. "pillow" of polymer. Bags of polymer must be cut open by hand and the blocked material has to be fed into a mechanical grinder prior to mixing with other ingredients.

Many polymers, especially thermoplastic but non-elastomeric polymers, are conveniently manufactured in pellet form. This form is very easy to handle and agglomeration problems can be easily solved by dusting the polymer with anti-stick agents. Pellets of these commercial thermoplastic polymers are formed with melt extruders, often twin screw extruders, which carry out their function by melting the polymer and extruding it through a die where it is chopped into small pellets. Many of the polymers of this invention are high molecular weight materials and highly elastic materials. When these polymers are processed in twin screw melt extruders, they tend to generate enough shear heat to cause significant degradation. Degradation causes the polymer properties to suffer and is a significant disadvantage.

It is clear therefore that it would be highly advantageous to be able to finish the sticky elastomeric polymers of this invention in such a manner that they could be produced in pellet form. It would be most advantageous that this process be able to be carried out without significant polymer degradation.

SUMMARY OF THE INVENTION

This invention solves the problems discussed above. Elastomeric anionic polymers of styrene and butadiene or isoprene, including polyisoprene star polymers, are anionically polymerized as in the past. This processing may also incorporate hydrogenation if desired. The polymer is produced in crumb form.

The dried polymer crumb is then converted to pellets via solid state extrusion. The polymer crumb is extruded in a single screw extruder which has a longitudinally grooved barrel and has pins extending into the barrel transverse to the flow of the polymer. The extruder has a length to diameter (L/D) ratio of 10:1 or less, preferably 8:1 or less, and is operated at 30 to 100 rpm, preferably 40 to 60 rpm. The temperature of the polymer in the extruder must be sufficient to agglomerate or melt the polymer but the temperature should not exceed the degradation temperature of the polymer. Preferably, the solid state extrusion is carried out at 200° C. or less and most preferably 160° C. or less.

DETAILED DESCRIPTION OF THE INVENTION

It is necessary to use a single screw extruder in this solid state extrusion process in order to minimize shearing of the polymer. Excessive shearing can cause an undesirable increase in the temperature of the polymer which, as discussed above, can cause significant degradation. Twin screw extruders increase the shearing of the polymer and thus they may not be used in the present invention.

In this process, sufficient mechanical heat is generated by the polymer extrusion without auxiliary heating of the equipment or preheating of the crumb being necessary. Sufficient heat must be generated in order to agglomerate or melt the polymer sufficiently so that it can be extruded and then cut into pellets. By agglomerate, we mean that the polymer is soft enough and sticky enough to stick together but has not yet passed through the glass transition temperature which is the point at which the polymer melts.

Polymers of the type described herein are known to degrade at temperatures of 300° C. and higher so it is important that the temperature in the single screw extruder be less than that. However, it is possible that higher localized temperatures can occur in the extruder so it is highly preferred that the temperature in the extruder be 200° C. or less. It is most preferred that the temperature be 160° C. or less to minimize localized temperature peaks which can cause degradation of the polymer at those locations.

The use of a single screw (as opposed to twin screw) is necessary to get agglomeration without high temperature but it is important that sufficient mixing of the polymer occur. In order to make certain that this occurs, the barrel of the single screw extruder has longitudinal grooves and pins extending into the barrel transverse to the flow of the polymer. These features increase the mixing without dramatically increasing the shearing of the polymer.

The longer the polymer is processed in the extruder, the more likely it is that degradation of the polymer will occur. Thus, it is preferred that long extruders not be used. It is preferred that the length to diameter (L/D) ratio be 10:1 or less, preferably 8:1 or less, most preferably about 4:1.

In order to obtain sufficient mixing, the speed of the extruder screw should be from 30 to 100 rpm for extruders with an L/D ratio of from 2:1 to 10:1. If the L/D ratio is smaller, then the speed of the screw can be lower. Again, the goal is to provide sufficient mixing without heating up the polymers to a temperature where it degrades.

The polymers suitable for finishing by the process of this invention include hydrogenated homopolymers and copolymers of diolefins containing from 4 to about 12 carbon atoms, hydrogenated copolymers of one or more conjugated diolefins and one or more monoalkenyl aromatic hydrocarbons containing from 8 to about 16 carbon atoms and the like. The base polymer may be of a star or linear structure. Hydrogenated polymers may be hydrogenated selectively, completely or partially. Hydrogenated polymers of conjugated diolefins and copolymers of conjugated diolefins and monoalkenyl arenes are preferably hydrogenated such that greater than 90% of the initial ethylenic unsaturation is removed by hydrogenation. Preferably, the hydrogenated polymers are substantially free of ethylenic unsaturation.

Selective hydrogenation refers to processes that hydrogenate a substantial portion of the ethylenic unsaturation and a substantial portion of the initial aromatic unsaturation is left unhydrogenated. As used herein, a hydrocarbon polymer substantially free of ethylenic unsaturation will be a hydrocarbon polymer containing, on average, less than about 10 carbon-carbon ethylenic double bonds per polymer chain. Polymers containing more than this amount of ethylenic unsaturation will, under certain conditions, exhibit excessive crosslinking during a functionalization reaction when the finctionalization is completed in a blending apparatus capable of imparting high mechanical shear.

Useful hydrocarbon polymers include those prepared in bulk, suspension, solution or emulsion. As is well known, polymerization of monomers to produce hydrocarbon polymers may be accomplished using free-radical, cationic and anionic initiators or polymerization catalysts.

A wide range of molecular weight polymers can be processed as described herein. In general, the higher the molecular weight of the polymer, the more likely it is that degradation of the polymer will occur in conventional melt processing. Thus, this invention is especially advantageous for higher molecular weight polymers. In general, polymers with weight average molecular weights of between about 100,000 and about 1,200,000 may be processed according to this process The weight average molecular weights, as used herein, for linear anionic polymers refers to the weight average molecular weight as measured by Gel Permeation Chromatograph ("GPC") with a polystyrene standard. For star polymers, the weight average molecular weights are determined by light scattering techniques.

EXAMPLES

Comparative Example 1

To better understand melt extruder performance, we performed several typical lab-scale Theological tests. First of all, we attempted to measure the melt flow index (MFI) of Polymer A, which is a hydrogenated polyisoprene star polymer containing 6% by weight polystyrene, at temperatures up to 270° C. Even at these high temperatures and with weight as high as 9.9 kg, the material was extremely difficult to press through the melt flow die hole (0.008 in die). Additional testing using a capillary rheometer at equally high temperatures yielded poor results. We attempted to extrude Polymer B, another hydrogenated polyisoprene star polymer containing 6% by weight polystyrene, using a 0.75" Brabender single screw melt extruder heated to 200 to 220° C. and indeed some degradation did appear to occur. Twin screw extruders with their high shear mixing abilities might produce even more degradation.

Example 2

Several different polymer grades were agglomerated and pelletized in a 2.25 inch single screw extruder with attached Bodine motor adapted with cutter blades. The extruder had 6⅜ inch wide and ¹⁄₁₆ inch deep longitudinal grooves in the barrel and 10 pins extending transverse to the flow.

Details of the extruder designs are shown in Table 1. We utilized this extruder to determine if we could agglomerate different elastomeric polymer crumb materials. Somewhat surprisingly, the extruder was easily able to produce pellets of many different such materials. In all testing, we have seen no evidence of polymer degradation in this type of extrusion.

TABLE 1

| Single Screw Extruders | | | | | |
| --- | --- | --- | --- | --- | --- |
| auger diameter | pitch | compression ratio | L/D | feeder | HP |
| 2.25 inch | 1.69" | no compression | 6 | single paddle packer | 3 |
| 4 inch | 4" to 3" | 1.38:1 | 4 | twin paddle packer | 15 |

Unlike typical plastics extruders (melt), we do not utilize any additional heating of the extruder parts to accomplish agglomeration. The L/D ratio of the extruder is generally low in contrast to the typical L/D's of melt extruders that are in the range of 15–30. In addition, these single screw extruders deliver high torque at low RPM, thereby minimizing degradation due to shear heating. The high torque capabilities allow them to easily process these highly elastic materials. The extruders tested have grooved barrels and pins. These two features ensure that material is uniformly sheared and therefore heated for agglomeration. Additional trials without grooves and pins were not as successful.

The 2.25" extruder was fitted with a variable speed cutter to pelletize the extruded strands. All materials tested have been extruded successfully with no degradation. It was a bit more difficult to achieve a homogenous strand with Polymer C which is a linear hydrogenated block copolymer of styrene and isoprene. Some strands appeared to have a "dust" of crumb along the outer edge indicating possible slippage along the barrel cavity and insufficient mixing. This disappears as extruder temperatures rise.

We have also extruded several KRATON® materials using the 2.25" unit. Research polymers KRATON® GRP-6919 and GRP-6912, and commercial materials SHELLVIS® 50, 90, 260, 300 performed well. Commercial polymers KRATON® G1651, G1650, G1652, and research grade GRP-6917 were successfully pelletized after experimenting with different die designs. All of these polymers are manufactured by Shell Chemical Company and are block copolymers of styrene and/or hydrogenated isoprene and/or butadiene.

After the success of the 2.25" trials, we used the larger 4" extruder. Details of the extruder design can be found in Table 1. This extruder also had pins and grooves in the barrel. Results proved equally successful. A large pelletization test run to produce approximately 3000 lbs. of Polymer A was successfully performed. Typical run conditions were 35 rpm, 11.5 amps, and a production rate of 3 lb/min. The ⅛" hole-size, 254 hole die was fit with a two blade pelletizer to cut the material as it was extruded. Pellets then fell into a small fluidized cooler. The cooler was equipped with a fan that delivered room temperature air at a rate up to 2500 cu ft/min. A temperature probe was placed approximately halfway down the barrel. The process appeared to reach steady state with a measured barrel temperature of 150° C. This temperature is due to the shear heating of the material. No external heating or cooling was applied. Pellets leaving the cooler were at a temperature of approximately 80° C. No polymer degradation was observed in samples taken throughout the run.

Gel permeation chromatography analysis of crumb and extruded Polymers A and B from both of the extruders exhibits no signs of degradation. Polymer A and Polymer B were also tested in their intended use as an additive in motor oils. Both crumb and pellet forms were used. A comparison of Theological measurements of oil concentrates with crumb and pellet showed no change in the fundamental properties of the polymers with the extrusion.

We claim:

1. A process for pelletizing an elastomeric block copolymer, comprising extruding the block copolymer in a single screw extruder at a temperature sufficient to agglomerate or melt the block copolymer and less than a degradation temperature of the block copolymer, wherein the extruder has a screw speed from 30 to 100 rpm, a length to diameter ratio of 8:1 or less, and a barrel comprising longitudinal grooves and transversally extending pins.

2. The process of claim 1, wherein the temperature in the extruder is 200° C. or less.

3. The process of claim 2, wherein the temperature in the extruder is 160° C. or less.

4. The process of claim 1, wherein the screw speed is from 40 to 60 rpm.

5. The process of claim 1, wherein the block copolymer is a block copolymer of styrene and butadiene.

6. The process of claim 1, wherein the block copolymer is a block copolymer of styrene and isoprene.

7. The process of claim 1, wherein the block copolymer has a weight average molecular weight of about 100,000 to about 1,200,000.

8. A process for pelletizing an elastomeric block copolymer, consisting essentially of extruding the block copolymer in a single screw extruder at a screw speed of 30 to 100 rpm, wherein the single screw extruder has a length to diameter ratio of 8:1 or less and a barrel comprising longitudinal grooves and transversally extending pins, and wherein the block copolymer has a weight average molecular weight of about 100,000 to about 1,200,000.

9. The process of claim 8, wherein the block copolymer is extruded at a temperature of 200°C. or less.

10. The process of claim 8, wherein the block copolymer is extruded at a temperature of 160° C. or less.

11. The process of claim 8, wherein the screw speed is from about 40 to about 60 rpm.

12. The process of claim 8, wherein the block copolymer is a block copolymer of styrene and butadiene.

13. The process of claim 8, wherein the block copolymer is a block copolymer of styrene and isoprene.

* * * * *